(12) United States Patent
Shimobayashi (10) Patent No.: US 8,780,751 B2
(45) Date of Patent: Jul. 15, 2014

(54) COMMUNICATION TERMINAL

(75) Inventor: Shinya Shimobayashi, Tokyo (JP)

(73) Assignee: Nec Corporation, Tokyo (JP)

( * ) Notice: Subject to any disclaimer, the term of this patent is extended or adjusted under 35 U.S.C. 154(b) by 353 days.

(21) Appl. No.: 13/390,338

(22) PCT Filed: May 24, 2010

(86) PCT No.: PCT/JP2010/058703
§ 371 (c)(1),
(2), (4) Date: Feb. 14, 2012

(87) PCT Pub. No.: WO2011/024524
PCT Pub. Date: Mar. 3, 2011

(65) Prior Publication Data
US 2012/0140670 A1    Jun. 7, 2012

(30) Foreign Application Priority Data

Aug. 24, 2009   (JP) .................................. 2009-192930

(51) Int. Cl.
*G01R 31/08*    (2006.01)
(52) U.S. Cl.
USPC .......................................................... 370/252
(58) Field of Classification Search
USPC .......................................... 370/252, 335, 342
See application file for complete search history.

(56) References Cited

U.S. PATENT DOCUMENTS

| | | | |
|---|---|---|---|
| 8,548,512 | B2 | 10/2013 | Nagata |
| 2003/0099285 | A1* | 5/2003 | Graziano et al. ............. 375/220 |
| 2008/0232492 | A1 | 9/2008 | Xiao |
| 2009/0154588 | A1* | 6/2009 | Chen et al. ................... 375/267 |

FOREIGN PATENT DOCUMENTS

| | | |
|---|---|---|
| CN | 101466151 A | 6/2009 |
| JP | 2006-295727 | 10/2006 |
| JP | 2007-274094 | 10/2007 |
| JP | 2007-274159 | 10/2007 |
| JP | 2008-048418 | 2/2008 |
| JP | 2009-514359 | 4/2009 |
| JP | 2009-100204 | 5/2009 |
| WO | 2008-115772 A1 | 9/2008 |
| WO | 2009-087924 A1 | 7/2009 |

OTHER PUBLICATIONS

Chinese Office Action dated Feb. 8, 2014; Patent Application No. 201080037974.7 with partial English Translation.
International Search Report—PCT/JP2010/058703—Jun. 22, 2010.
3GPP TS 36.213 V8.7.0—3rd Generation Partnership Project; Technical Specification Group Radio Access Network; Evolved Universal Terrestrial Radio Access (E-UTRA); Physical layer procedures (Release 8) (May 2009).
NEC Group, Bandwidth part sizes for UE selected CQI reports on the PUCCH, TSG-RAN WG1 #54 R1-83003, Aug. 18, 2008.

* cited by examiner

*Primary Examiner* — Mohammad Anwar
(74) *Attorney, Agent, or Firm* — Young & Thompson (57) ABSTRACT

When a determining unit (110) determines, based on the number of resource blocks in the entire system band and the number of resource blocks per subband, that a subband formed of a lower number of resource blocks than the number of resource blocks per subband is present, a channel capacity calculator (140), using a combined noise power which a noise power calculator (120) calculates based on reference signals included in the small subband and the adjacent subband and a combined signal power which a signal power calculator (130) calculates based on reference signals included in the small subband and the adjacent subband and the combined noise power, and a CQI transmitter (150) transmits the result to a radio base station.

7 Claims, 6 Drawing Sheets

Fig. 1

| System Bandwidth $N_{RB}^{DL}$ | Subband Size ($k$) |
|---|---|
| 6 – 7 | NA |
| 8 – 10 | 4 |
| 11 – 26 | 4 |
| 27 – 63 | 6 |
| 64 – 110 | 8 |

COMMUNICATION TERMINAL

TECHNICAL FIELD

The present invention relates to a communication terminal for performing radio communication, a method and program of communication quality calculation in a communication terminal

BACKGROUND ART

Recently, studies on LTE (Long Term Evolution) have been in progress as Rel-8 specifications in 3GPP (3rd Generation Partnership Project) (for example, see non-patent document 1).

In this LTE, in order to enhance the efficiency of data transfer to a communication terminal, the communication quality of the downlink channel from the radio base station to the communication terminal is measured (calculated) by the communication terminal, and the result of measurement is transmitted (reported) as quality information CQI (Channel Quality Information) from the communication terminal to the radio base station.

Here, since LTE uses broadband, the system bandwidth is divided into multiple bands (subbands) and communication quality is measured for each subband and reported. This enables the radio base station to select resources of good communication quality and thereby perform efficient data transmission.

As described in non-patent document 1, for aperiodic CQI, the number of resource blocks per subband has been determined beforehand in accordance with the number of resource blocks in the entire system band. Here, the resource block is the unit of blocks into which radio resources are divided in a predetermined size.

Figure 1:
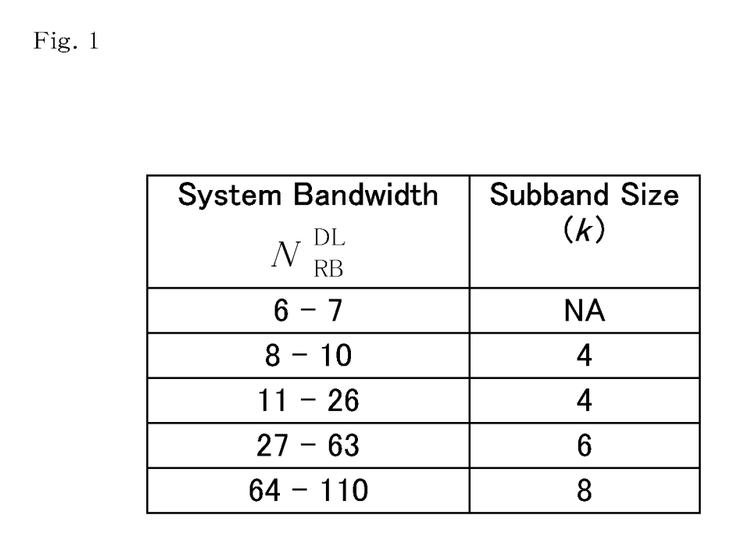
[FIG. 1] is a chart showing the correspondence between the number of resource blocks in the entire system band and the number of resource blocks per subband.

FIG. 1 is a chart showing the correspondence between the number of resource blocks in the entire system band and the number of resource blocks per subband. This correspondence is the one that is disclosed in Table 7.2. 1-3 in non-patent document 1.

As shown in FIG. 1, the number of resource blocks in the entire system band and the number of resource blocks per subband are related beforehand. For example, when the number of resource blocks in the entire system band is 25, the number of resource blocks per subband is

PRIOR ART DOCUMENTS

Non-Patent Document

Non-patent Document 1: 3GPP TS36.213 V8.7.0(2009-05)

SUMMARY OF THE INVENTION

Problems to be Solved by the Invention

However, depending on the number of resource blocks in the entire system band there occur cases in which a subband that consists of a lower number of resource blocks than the associated number of resource blocks per subband is present.

Figure 2:
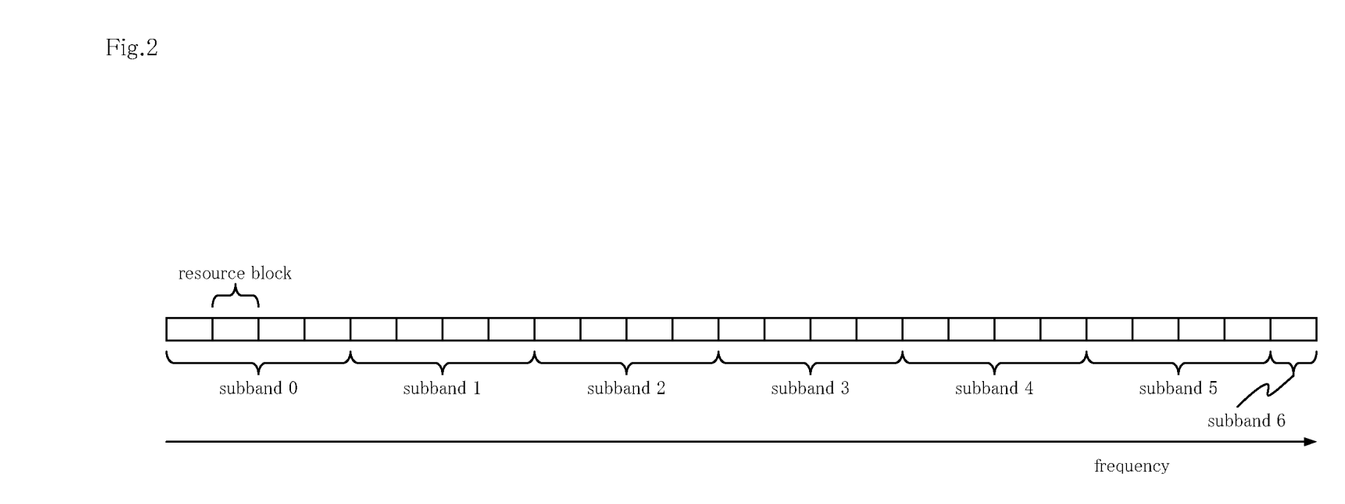
[FIG. 2] is a diagram showing one example of subband allocation when the system bandwidth is 5 MHz and the number of resource blocks in the entire system band is 25.

FIG. 2 is a diagram showing one example of subband allocation when the system bandwidth is 5 MHz and the number of resource blocks in the entire system band is 25.

In the subband allocation shown in FIG. 2, the number of resource blocks in the entire system band is 25. From the correspondence shown in FIG. 1, the number of resource blocks per subband is 4.

Accordingly, as shown in FIG. 2, subbands 0 to 5 are each formed of four resource blocks whereas subband 6 is formed of one resource (the remainder when 25 is divided by 4). That is, the number of resource blocks in subband 6 is smaller than the number of resource blocks in each of subbands 0 to 5.

As the number of resource blocks included in a subband is smaller in the above way, the number of reference signals included in resource blocks becomes lower within the subband in question. As a result, there occurs the problem in which the measurement accuracy of communication quality using the reference signals degrades.

The object of the present invention is to provide a communication terminal and communication quality calculation method and program to solve the above problem.

Means for Solving the Problems

The communication terminal of the present invention is a communication terminal that calculates the communication quality of a signal transmitted from a radio base station, for each of multiple subbands into which a system bandwidth is divided, comprising:

a determining unit that determines, based on the number of resource blocks, as the unit of radio resource, in the entire system band, and based on the number of resource blocks for each of the subbands, designated in accordance with the number of resource blocks in the entire system band, whether a small band or a subband formed of a lower number of resource blocks than the number of resource blocks for each of the subbands is present;

a noise power calculator that calculates the noise power of the signal for each of the subbands, using reference signals included in the signal transmitted from the radio base station;

a signal power calculator that calculates the signal power of the signal for each of subbands, using the reference signals and the noise power calculated by the noise power calculator;

a channel capacity calculator that calculates the channel capacity for each of the subbands, based on the noise power and the signal power; and, a CQI transmitter that transmits CQI (Channel Quality Information) to the radio base station, based on the channel capacity, wherein the noise power calculator, when the determining unit determines that the small subband is present, calculates the noise power as combined noise power, using the reference signals included in the small subband and the adjacent subband next to the small subband, the signal power calculator, when the determining unit determines that the small subband is present, calculates the signal power as combined signal power, using the reference signals included in the small subband and the adjacent subband next to the small subband and the combined noise power, and the channel capacity calculator calculates combined channel capacity based on the combined noise power and the combined signal power, and calculates channel capacity in the small subband based on the combined channel capacity and the channel capacity calculated in the adjacent subband.

The communication quality calculation method of the present invention is a communication quality calculation method for calculating the communication quality of a signal transmitted from a radio base station to a communication terminal, for each of multiple subbands into which a system bandwidth is divided, comprising:

a process of determining, based on the number of resource blocks, as the unit of radio resource, in the entire system band, and based on the number of resource blocks for each of the subbands, designated in accordance with the number of resource blocks in the entire system band, whether a small band or a subband formed of a lower number of resource blocks than the number of resource blocks for each of the subbands is present;

a process of calculating the noise power of the signal for each of the subbands, using reference signals included in the signal transmitted from the radio base station to the communication terminal;

a process of calculating the signal power of the signal for each of subbands, using the reference signals and the noise power;

a process of calculating channel capacity for each of the subbands, based on the noise power and the signal power;

a process of calculating the noise power as combined noise power, using the reference signals included in the small subband and the adjacent subband next to the small subband when it is determined that the small subband is present;

a process of calculating the signal power as combined signal power, using the reference signals included in the small subband and the adjacent subband next to the small subband, when it is determined that the small subband is present;

a process of calculating combined channel capacity based on the combined noise power and the combined signal power;

a process of calculating channel capacity in the small subband, based on the combined channel capacity and the channel capacity calculated in the adjacent subband; and, a process of transmitting CQI (Channel Quality Information) from the communication terminal to the radio base station, based on the channel capacity.

The program of the present invention is a program for causing a communication terminal that calculates the communication quality of a signal transmitted from a radio base station, for each of multiple subbands into which a system bandwidth is divided, to execute:

a procedure of determining, based on the number of resource blocks, as the unit of radio resource, in the entire system band, and based on the number of resource blocks for each of the subbands, designated in accordance with the number of resource blocks in the entire system band, whether a small band or a subband formed of a lower number of resource blocks than the number of resource blocks for each of the subbands is present;

a procedure of calculating the noise power of the signal for each of the subbands, using reference signals included in the signal transmitted from the radio base station;

a procedure of calculating the signal power of the signal for each of subbands, using the reference signals and the noise power;

a procedure of calculating channel capacity for each of the subbands, based on the noise power and the signal power;

a procedure of calculating the noise power as combined noise power, using the reference signals included in the small subband and the adjacent subband next to the small subband when it is determined that the small subband is present;

a procedure of calculating the signal power as combined signal power, using the reference signals included in the small subband and the adjacent subband next to the small subband, when it is determined that the small subband is present;

a procedure of calculating combined channel capacity based on the combined noise power and the combined signal power;

a procedure of calculating channel capacity in the small subband, based on the combined channel capacity and the channel capacity calculated in the adjacent subband; and, a procedure of transmitting CQI (Channel Quality Information) from the communication terminal to the radio base station, based on the channel capacity.

Effect of the Invention

As has been described, in the present invention it is possible to prevent degradation of measurement accuracy of communication quality

MODE FOR CARRYING OUT THE INVENTION

The embodied mode of the present invention will be described hereinbelow with reference to the drawings.

Figure 3:
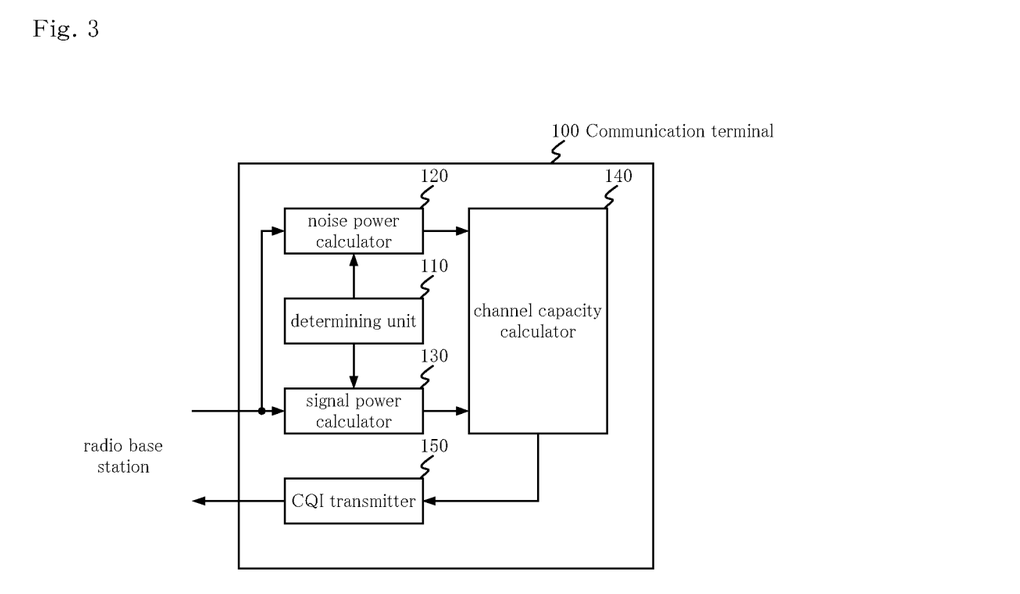
[FIG. 3] is a diagram showing one exemplary mode of a communication terminal of the present invention.

FIG. 3 is a diagram showing one exemplary mode of a communication terminal of the present invention.

Communication terminal 100 in the present mode includes determining unit 110, noise power calculator 120, signal power calculator 130, channel capacity calculator 140 and CQI transmitter 150.

Determining unit 110 determines, based on the number of resource blocks in the entire system band and the number of resource blocks per subband, whether a subband (small subband) formed of a lower number of resource blocks than the number of resource blocks per subband is present. Here, the number of resource blocks per subband has been previously designated in accordance with the number of resource blocks in the entire system band as shown in FIG. 1. Further, as has been explained with FIG. 2, determining unit 110 determines that no small subband is present when the number of resource blocks in the entire system band can be divided by the number of resource blocks per subband because no subband formed of a lower number of resource blocks than the number of resource blocks per subband is present. On the other hand, determining unit 110 determines that a small subband is present when the number of resource blocks in the entire system band cannot be divided by the number of resource blocks per subband without a remainder (there is a remainder) because a subband formed of a lower number of resource blocks than the number of resource blocks per subband is present. In the example shown in FIG. 2, subband 6 is the small subband.

Noise power calculator 120 calculates the noise power of a signal for each subband, using reference signals included in the signal transmitted from a radio base station with which communication terminal 100 is communicating. When determining unit 110 determines that a small subband is present, noise power calculator 120 also calculates the noise power of the signal as combined noise power, using the reference signals included in the small subband and the subband next to the small subband (adjacent subband). In the example shown in FIG. 2, subband 5 next to the small subband or subband 6 is the adjacent subband.

Now, the reference signal will be described.

Figure 4:
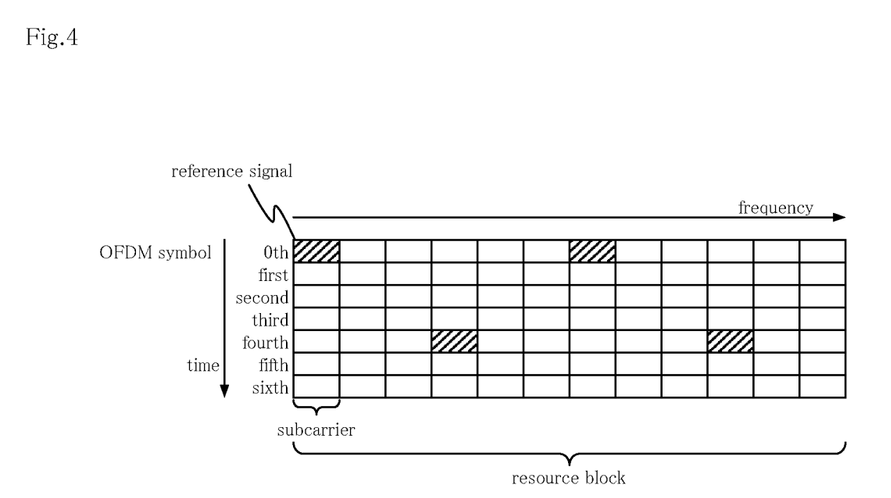
[FIG. 4] is a diagram showing one example of allocation reference signals in a resource block.

FIG. 4 is a diagram showing one example of allocation of reference signals in a resource block.

As shown in FIG. 4, reference signals are allocated in 0th and 4th OFDM (Orthogonal Frequency Division Multiplexing) symbols for every six subcarriers in the resource block.

Signal power calculator 130 calculates the signal power of a signal for each subband, using the reference signals included in the signal transmitted from the radio base station with which communication terminal 100 is communicating and using the noise power calculated by noise power calculator 120. Further, when determining unit 110 determines that a small subband is present, signal power calculator 130 calculates the signal power of the signal as combined signal power, using the reference signals included in the small subband and the subband (adjacent subband) next to the small subband and the combined noise power calculated by noise power calculator 120.

Channel capacity calculator 140, based on the noise power calculated by noise power calculator 120 and the signal power calculated by signal power calculator 130, calculates channel capacity as the permissible amount of information that can be reliably transmitted between the radio base station and communication terminal 100. Channel capacity calculator 140 also calculates combined channel capacity based on the combined noise power calculated by noise power calculator 120 and the combined signal power calculated by signal power calculator 130. Channel capacity calculator 140 further calculates channel capacity in the small subband based on the calculated combined channel capacity and the calculated channel capacity in the adjacent subband.

CQI transmitter 150 transmits the channel capacity calculated by channel capacity calculator 140 as CQI (Channel Quality Information) to the radio base station.

Next, the communication quality calculation method in the present mode will be described. Communication quality calculation is performed by calculating SNR (Signal to Noise Ratio) from the noise power value and the signal power value using reference signals included in each resource block and then calculating channel capacity from the calculated SNR. Here, description will be made by taking an example of a case in which the arrangement of the subbands is as shown in FIG. 2.

Figure 5:
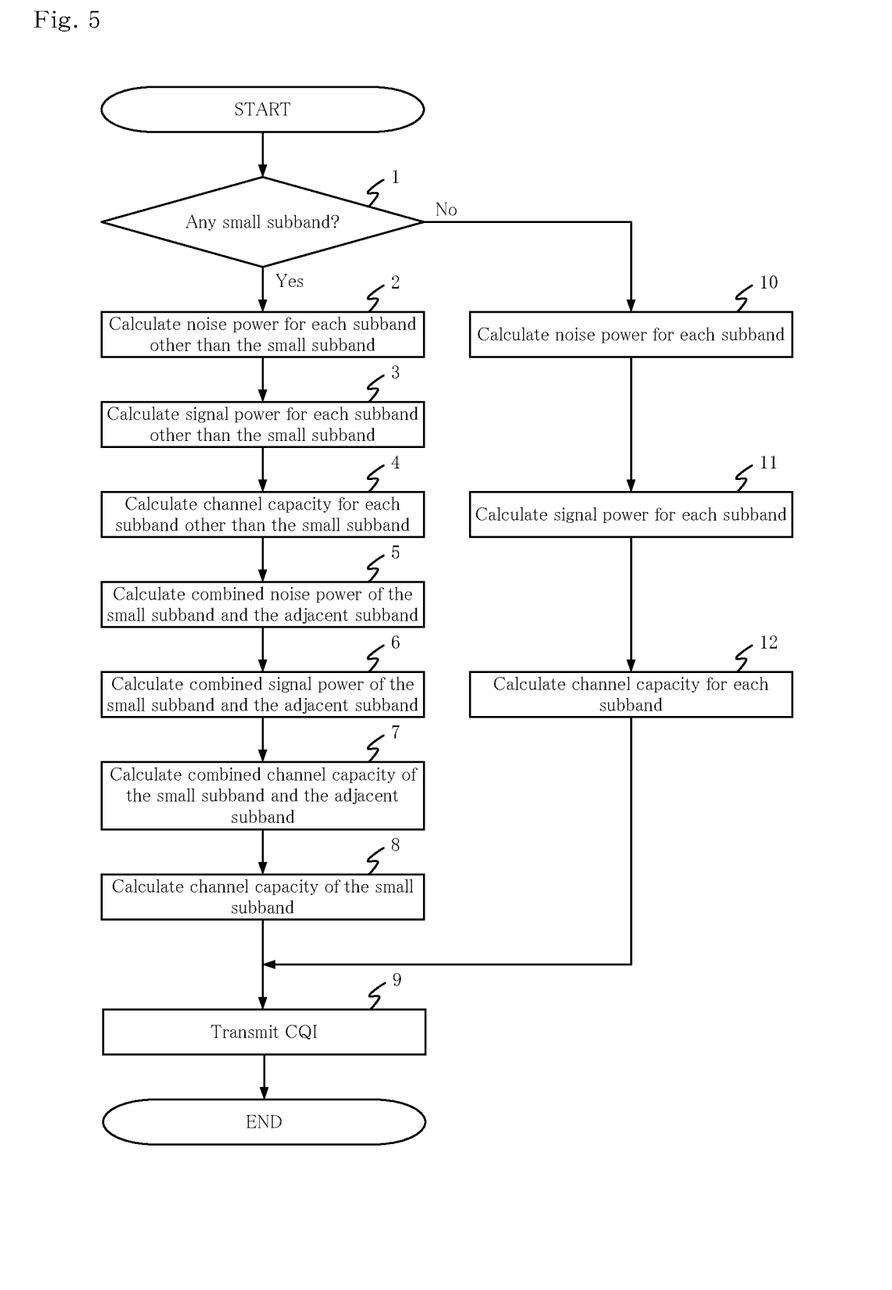
[FIG. 5] is a flow chart for illustrating a communication quality calculation method in the present embodiment.

FIG. 5 is a flow chart for illustrating the communication quality calculation method in the present embodiment.

To begin with, at determining unit 110, it is determined at Step 1, whether a small subband based on the number of resource blocks in the entire system band and the number of resource blocks per subband is present. For this determination, the aforementioned basis is used.

When it is determined at Step 1 that there exists a small subband, noise power calculator 120 calculates the noise power of the signal for each subband other than the small subband, using the reference signals included in the signal transmitted from the radio base station, at Step 2. Specifically, this can be calculated by using $h_{ZF}$ or the Zero Forcing value (ZF value) that is obtained by multiplying the received reference signal with the conjugate of the reference signal. Here, $h_{ZF}(m)$ is the ZF value of the m-th (m is a natural number) reference signal included in the 0-th OFDM symbol in the subband.

For example, noise power $\sigma^2_{est,1}$ of subband 5 can be calculated by (Formula 1) because the number of reference signals included in the 0-th OFDM symbol of subband 5 is eight (2 signals×4 resource blocks).

[Math 1]

$$\sigma^2_{est,1} = \frac{1}{7}\sum_{m=0}^{6}|h_{ZF}(m) - h_{ZF}(m+1)|^2 \quad \text{(Formula 1)}$$

Subsequently, at Step 3 signal power calculator 130 calculates the signal power of the signal for each subband other than the small subband, using the reference signals included in the signal transmitted from the radio base station and the noise power calculated at Step 2.

For example, signal power $S_{est,1}$ of subband 5 is calculated by (Formula 2).

[Math 2]

$$S_{est,1} = \frac{1}{8}\sum_{m=0}^{7}|h_{ZF}(m)|^2 - \sigma^2_{est,1} \quad \text{(Formula 2)}$$

Subsequently, channel capacity calculator 140 calculates the SNR value of the signal for each subband other than the small subband, based on the noise power calculated at Step 2 and the signal power calculated at Step 3.

For example, SNR value SNR1 of subband 5 is calculated by (Formula 3).

[Math 3]

$$SNR1 = \frac{S_{est,1}}{\sigma^2_{est,1}} \quad \text{(Formula 3)}$$

Then, at Step 4 channel capacity calculator 140 calculates channel capacity for each subband other than the small subband, using the SNR value.

For example, channel capacity C1 of subband 5 is calculated by (Formula 4)

[Math 4]

$$C1 = \log_2(1+SNR1) \quad \text{(Formula 4)}$$

Now, a case of performing a similar calculation for the small subband or subband 6 will be considered.

Noise power $\sigma^2_{est,3}$ of subband 6 can be calculated by (Formula 5) because the number of reference signals included in the 0-th OFDM symbol of subband 6 is two (2 signals×1 resource block).

[Math 5]

$$\sigma^2_{est,3} = |h_{ZF}(m)-h_{ZF}(m+1)|^2 \quad \text{(Formula 5)}$$

Subsequently, signal power $S_{est,3}$ of subband 6 is calculated by (Formula 6).

[Math 6]

$$S_{est,3} = \frac{1}{2}\sum_{m=0}^{1}|h_{ZF}(m)|^2 - \sigma^2_{est,3} \quad \text{(Formula 6)}$$

Subsequently, SNR value SNR3 of subband 5 is calculated by (Formula 7).

[Math 7]

$$SNR3 = \frac{S_{est,3}}{\sigma_{est,3}^2} \quad \text{(Formula 7)}$$

Then, channel capacity C3 of subband 6 is calculated by (Formula 8).

[Math 8]

$$C3 = \log_2(1+SNR3) \quad \text{(Formula 8)}$$

If the channel capacity of the small subband or subband 6 is calculated in the above way, it is expected that the channel capacity is likely to be affected by instantaneous variation and hence the estimated accuracy of the channel capacity will degrade because the number of samples used for calculating noise power $\sigma_{est,3}^2$ is small.

To deal with this, when calculating the channel capacity of the small subband or subband 6, the calculation is performed by using the band range of the adjacent subband or subband 5 to increase the number of samples.

Figure 6:
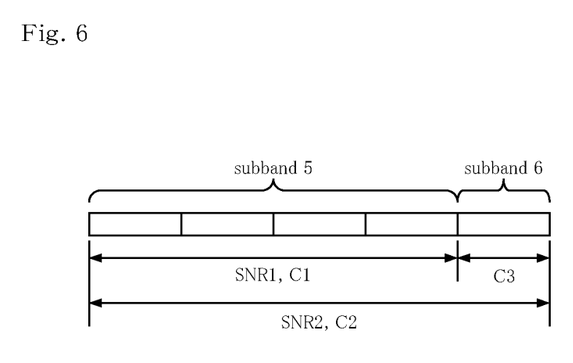
[FIG. 6] is a diagram showing the correspondence between SNR and channel capacity in subband 5 and subband 6.

FIG. 6 is a diagram showing the relationship between SNR and channel capacity in subband 5 and subband 6.

As shown in FIG. 6, in order to determine channel capacity C3 of subband 6, the SNR (SNR2) of subband 5 and subband 6 and channel capacity (C2), the SNR(SNR1) of subband 5 and channel capacity (C1) are used. This will be described hereinbelow.

At noise power calculator 120, the reference signals included in the small subband or subband 6 and the reference signals included in the adjacent subband or subband 5 are used to calculate the noise power of the signal as combined noise power $\sigma_{est,2}^2$.

This combined noise power $\sigma_{est,2}^2$ can be calculated by (Formula 9) because the number of reference signals included in the 0-th OFDM symbol of subband 5 is eight and the number of reference signals included in the 0-th OFDM symbol of subband 6 is two. Accordingly, the total number of reference signals is 10(8+2).

[Math 9]

$$\sigma_{est,2}^2 = \frac{1}{9}\sum_{m=0}^{8} |h_{ZF}(m) - h_{ZF}(m+1)|^2 \quad \text{(Formula 9)}$$

Subsequently, signal power calculator 130 calculates signal power of the signal as combined signal power $S_{est,2}$ by (Formula 10) at Step 6, using the reference signals included in subband 6, the reference signals included in subband 5 and the combined noise power $\sigma_{est,2}^2$ calculated at Step 5.

[Math 10]

$$S_{est,2} = \frac{1}{10}\sum_{m=0}^{9} |h_{ZF}(m)|^2 - \sigma_{est,2}^2 \quad \text{(Formula 10)}$$

Subsequently, channel capacity calculator 140 calculates the SNR value of the signal as combined SNR value SNR2 by (Formula 11), using combined noise power $\sigma_{est,2}^2$ calculated at Step 5 and the combined signal power $S_{est,2}$ calculated at Step 6.

[Math 11]

$$SNR2 = \frac{S_{est,2}}{\sigma_{est,2}^2} \quad \text{(Formula 11)}$$

Then, at Step 7 channel capacity calculator 140 calculates channel capacity as combined channel capacity C2 by (Formula 12), using combined SNR value SNR2.

[Math 12]

$$C2 = \log_2(1+SNR2) \quad \text{(Formula 12)}$$

Then, based on channel capacity C1 of subband 5 calculated at Step 4 and combined channel capacity C2 calculated at Step 7, channel capacity C3 of subband 6 is calculated by channel capacity calculator 140 at Step 8.

At this point, combined channel capacity C2 can be considered to be the average of channel capacity C1 of subband 5 and channel capacity C3 of subband 6, hence can be considered as (Formula 13), taking into account the number of reference signals that were used for measurement.

[Math 13]

$$C2 = \frac{8\,C1 + 2\,C3}{10} \quad \text{(Formula 13)}$$

Accordingly, channel capacity C3 of subband 6 can be determined by (Formula 14).

[Math 14]

$$C3 = 5\,C2 - 4\,C1 \quad \text{(Formula 14)}$$

Thereafter, CQI that represents the calculated channel capacity in each subband is transmitted at Step 9 from CQI transmitter 150 to the radio base station.

On the other hand, when it is determined at Step 1 that no small subband is present, noise power calculator 120 calculates noise power of the signal for each subband at Step 10, using the reference signals included in the signal transmitted from the radio base station.

Subsequently, signal power calculator 130 calculates signal power of the signal for each subband, based on the reference signals included in the signal transmitted from the radio base station and the noise power calculated at Step 11.

Then, channel capacity calculator 140 calculates the SNR value of the signal for each subband, based on the noise power calculated at Step 10 and the signal power calculated at Step 11. This calculated SNR value is used to calculate channel capacity at Step 12.

Further, CQI that represents the calculated channel capacity at Step 12 is transmitted at Step 9 from CQI transmitter 150 to the radio base station.

As described heretofore, in the present invention, since the number of reference signals used for SNR estimation is greater than the case of direct calculation, it is hence possible to perform measurement with precision, without the likelihood of being affected by instantaneous variation of the reference signal in received value.

It should be noted that the process performed by each component provided for the aforementioned communication terminal 100 may be carried out by a logical circuit designed for the target purpose. Alternatively, the program described with the processing instructions may be recorded on a recording medium recordable by communication terminal 100, and communication terminal 100 may be made to read the program recorded on this recording medium and execute the program. The recording mediums readable by communication terminal 100 may include memory devices such as ROM, RAM etc., and HDDs and the like, which are built in communication terminal 100, as well as removable recording mediums such as floppy (registered trademark) disks, magneto optical disks, DVDs, CDs or the like. The program recorded on this recording medium is read by CPU (not shown) in communication terminal 100 so that the same process as that described above is carried out by CPU control. Herein, the meaning of CPU is a CPU that operates as a computer and that executes a program read from the recording medium recorded with the program.

Although the present invention has been explained with reference to the embodiment mode as above, the present invention should not be limited to the above embodiment mode. Various modifications that can be understood by those skilled in the art may be made to the structures and details of the present invention within the scope of the present invention.

This application claims priority based on Japanese Patent Application No. 2009-192930, filed on Aug. 24, 2009, and incorporates by reference all of the disclosures of that application.

The invention claimed is:

1. A communication terminal that calculates the communication quality of a signal transmitted from a radio base station, for each of multiple subbands into which a system bandwidth is divided, comprising:
   a determining unit that determines, based on the number of resource blocks, as the unit of radio resource, in the entire system band, and based on the number of resource blocks for each of the subbands, designated in accordance with the number of resource blocks in the entire system band in advance, whether a small band or a subband formed of a lower number of resource blocks than the number of resource blocks for each of the subbands is present;
   a noise power calculator that calculates noise power of the signal for each of the subbands, using reference signals included in the signal transmitted from the radio base station;
   a signal power calculator that calculates signal power of the signal for each of subbands, using the reference signals and the noise power calculated by the noise power calculator;
   a channel capacity calculator that calculates channel capacity for each of the subbands, based on the noise power and the signal power; and,
   a CQI transmitter that transmits CQI (Channel Quality Information) to the radio base station, based on the channel capacity, wherein
   the noise power calculator, when the determining unit determines that the small subband is present, calculates the noise power as combined noise power, using the reference signals included in the small subband and the adjacent subband next to the small subband,
   the signal power calculator, when the determining unit determines that the small subband is present, calculates the signal power as combined signal power, using the reference signals included in the small subband and the adjacent subband next to the small subband and the combined noise power, and
   the channel capacity calculator calculates combined channel capacity based on the combined noise power and the combined signal power, and calculates channel capacity in the small subband based on the combined channel capacity and the channel capacity calculated in the adjacent subband.

2. The communication terminal according to claim 1, wherein the channel capacity calculator calculates a SNR (Signal to Noise Ratio) based on the noise power and the signal power, calculates the channel capacity based on the SNR, calculates a combined SNR based on the combined noise power and the combined signal power and calculates the combined channel capacity based on the combined SNR.

3. The communication terminal according to claim 1, wherein the noise power calculator calculates the noise power and the combined noise power using the ZF (Zero Forcing) value of the reference signal, and
   the signal power calculator calculates the signal power using the ZF value of the reference signal and the noise power and calculates the combined signal power using the ZF value of the reference signal and the combined noise power.

4. The communication terminal according to claim 1, characterized by operating on the LTE (Long Term Evolution) standard.

5. A communication quality calculation method for calculating the communication quality of a signal transmitted from a radio base station to a communication terminal, for each of multiple subbands into which a system bandwidth is divided, comprising:
   a process of determining, based on the number of resource blocks, as the unit of radio resource, in the entire system band, and based on the number of resource blocks for each of the subbands, designated in accordance with the number of resource blocks in the entire system band, whether a small band or a subband formed of a lower number of resource blocks than the number of resource blocks for each of the subbands is present;
   a process of calculating noise power of the signal for each of the subbands, using reference signals included in the signal transmitted from the radio base station to the communication terminal;
   a process of calculating signal power of the signal for each of subbands, using the reference signals and the noise power;
   a process of calculating channel capacity for each of the subbands, based on the noise power and the signal power;
   a process of calculating the noise power as combined noise power, using the reference signals included in the small subband and the adjacent subband next to the small subband when it is determined that the small subband is present;
   a process of calculating the signal power as combined signal power, using the reference signals included in the small subband and the adjacent subband next to the small subband and the combined noise power, when it is determined that the small subband is present;
   a process of calculating combined channel capacity based on the combined noise power and the combined signal power;
   a process of calculating channel capacity in the small subband, based on the combined channel capacity and the channel capacity calculated in the adjacent subband; and,
   a process of transmitting CQI (Channel Quality Information) from the communication terminal to the radio base station, based on the channel capacity.

6. The communication quality method according to claim 5, further comprising:

a process of calculating a SNR (Signal to Noise Ratio) based on the noise power and the signal power;

a process of calculating the channel capacity based on the SNR;

a process of calculating a combined SNR based on the combined noise power and the combined signal power; and, a process of calculating the combined channel capacity based on the combined SNR.

7. The communication quality method according to claim 5, further comprising:

a process of calculating the noise power and the combined noise power using the ZF (Zero Forcing) value of the reference signal;

a process of calculating the signal power using the ZF value of the reference signal and the noise power; and, a process of calculating the combined signal power using the ZF value of the reference signal and the combined noise power.

* * * * *